US008864985B2

(12) United States Patent
Usher

(10) Patent No.: US 8,864,985 B2
(45) Date of Patent: Oct. 21, 2014

(54) OIL DECANTING SYSTEM

(71) Applicant: David Usher, Detriot, MI (US)

(72) Inventor: David Usher, Detriot, MI (US)

(*) Notice: Subject to any disclaimer, the term of this patent is extended or adjusted under 35 U.S.C. 154(b) by 0 days.

(21) Appl. No.: 13/971,571

(22) Filed: Aug. 20, 2013

(65) Prior Publication Data

US 2014/0083950 A1 Mar. 27, 2014

Related U.S. Application Data

(60) Provisional application No. 61/704,730, filed on Sep. 24, 2012.

(51) Int. Cl.
*B01D 21/24* (2006.01)
*B01D 21/30* (2006.01)
*C02F 1/40* (2006.01)

(52) U.S. Cl.
CPC ...................................... *C02F 1/40* (2013.01)
USPC .................. 210/85; 210/87; 210/93; 210/94; 210/96.1; 210/112; 210/134; 210/138; 210/242.3; 210/295; 210/513; 210/532.1

(58) Field of Classification Search
CPC .... B01D 17/02; B01D 17/12; B01D 21/0027; B01D 21/24; B01D 21/30; B01D 21/0024; B01D 21/0096; B01D 21/2405; B01D 21/2433; B01D 21/302; B01D 21/34; C02F 1/32; C02F 1/40; C02F 2103/08; C02F 2201/008; C02F 2209/05; C02F 2209/20
USPC ........ 210/86, 94, 96.1, 19, 241, 242.1, 242.3, 210/739, 745, 170.11, 747.5, 776, 85, 87, 210/93, 97, 112, 114, 134, 138, 143, 295, 210/513, 532.1, 747.6, 800
See application file for complete search history.

(56) References Cited

U.S. PATENT DOCUMENTS

| 3,468,421 | A | * | 9/1969 | Bakker et al. ................ 210/96.1 |
| 3,578,171 | A | | 5/1971 | Usher |
| 3,701,430 | A | * | 10/1972 | Tuttle .......................... 210/242.3 |
| 3,753,492 | A | * | 8/1973 | Aiello et al. ................. 210/96.1 |
| 3,944,489 | A | | 3/1976 | Derzhavets et al. |
| 4,064,893 | A | * | 12/1977 | Pitt ........................... 137/115.01 |
| 4,591,433 | A | * | 5/1986 | Budzich ........................ 210/114 |
| 4,647,371 | A | * | 3/1987 | Schmitt et al. ............... 210/96.1 |
| 4,649,281 | A | * | 3/1987 | Schmitt et al. ................ 250/574 |
| 4,943,370 | A | * | 7/1990 | Gortowski ..................... 210/85 |
| 5,091,096 | A | * | 2/1992 | Thomas et al. ............... 210/744 |
| 5,108,591 | A | | 4/1992 | Hagan |
| 5,149,443 | A | * | 9/1992 | Varnam ........................ 210/739 |
| 5,679,258 | A | * | 10/1997 | Petersen ....................... 210/703 |
| 5,948,266 | A | * | 9/1999 | Gore et al. .................... 210/693 |

(Continued)

*Primary Examiner* — Joseph Drodge
(74) *Attorney, Agent, or Firm* — Gifford, Krass, Sprinkle, Anderson & Citkowski, P.C.

(57) ABSTRACT

A method and apparatus for operating on skimmed oil/water picked up from a body of water to separate the oil from the water and discharge the oil-free water back into the body of water, first feeds the skimmed oil/water into a gravity settling tank wherein the oil tends to settle above the water, removing relatively oil-free water from the bottom of the tank and measuring its oil content with an oil concentration sensor, and either returning the oil/water flow to the settling tank for further processing if the measured concentration of oil exceeds predetermined limits or discharging the water back into the body of water if the oil concentration is measured to be less than the predetermined value.

8 Claims, 2 Drawing Sheets

(56) References Cited

U.S. PATENT DOCUMENTS

| | | | |
|---|---|---|---|
| 5,965,015 A * | 10/1999 | Ronan et al. | 210/87 |
| 6,251,286 B1 * | 6/2001 | Gore | 210/744 |
| 6,375,835 B1 * | 4/2002 | Lee et al. | 210/86 |
| 6,838,006 B2 * | 1/2005 | Feierabend et al. | 210/739 |
| 7,597,811 B2 | 10/2009 | Usher | |
| 8,083,935 B2 * | 12/2011 | Eia | 210/96.1 |
| 2013/0180900 A1 * | 7/2013 | Mason | 210/86 |
| 2013/0284677 A1 * | 10/2013 | Snydmiller et al. | 210/703 |

* cited by examiner

OIL DECANTING SYSTEM

CROSS-REFERENCE TO RELATED APPLICATIONS

This application claims priority of U.S. Provisional Application 61/704,730 filed Sep. 24, 2012, the contents of which are incorporated herein by reference.

FIELD OF THE INVENTION

This invention relates to a system for operating on skimmed oil/water picked up in cleaning an oil spill in a body of water to separate the oil from the water and discharge the oil-free water back into the body of water.

BACKGROUND OF THE INVENTION

When an oil spill occurs in a body of water it may be necessary to skim the oil off the water surface, inevitably with a certain volume of water, for later disposal of the oil. This is often done by a tanker ship or a smaller auxiliary vessel, and the mixture, termed skimmed oil/water, is stored in the ship. When the vessel's storage tanks become full it is necessary to either return the ship to a land port, where the skimmed oil/water is discharged for suitable treatment and disposal, or to keep the recovery ship at the spill site and offload its collected products to another ship for transport back to land. When the spill occurs far offshore, this system becomes time consuming and expensive.

If the oil could be separated from the water at the spill site and the oil-free water discharged back into the body of water, the volume of liquid to be stored would be substantially reduced, and important economies of equipment and time would be achieved. The present invention is accordingly directed toward a system for separating the oil from the water at a spill site so that the tanks of the collection vessel could be used for the storage of oil and the removed water discharged back into the water volume.

SUMMARY OF THE INVENTION

The broad concept of the present invention is to decant the skimmed oil/water by feeding it into a relatively small volume gravity based settling tank, located adjacent the spill site, in which the oil moves to the top of the tank because of the difference in the specific gravity between the oil and the water. The relatively pure water from the bottom is then passed through one or more oil content detectors. If the oil content of the passing oil exceeds the level set by a regulatory agency for feeding water back into the skimmed body of water, the oil is returned to the gravity based separator. Otherwise it is discharged into the body of water.

In a preferred embodiment of the invention, which will be subsequently described in detail, relatively pure water is pumped out of the bottom of the tank into a discharge hose through a screen which removes any sludge and debris. A flow meter disposed in the discharge hose controls a pump through which the discharging water flows to maintain a predetermined flow rate through the hose.

The presence of any possible oil intermixed with the discharged water, in proportions greater than those allowed by regulatory bodies for discharge in the water, typically about 15 ppm, is sensed by a first oil sensor having a probe extending into the discharge hose. This oil sensor may be any one of a variety of commercially available types operating on such phenomena as fluorescence of the oil when subject to ultraviolet illumination, conductivity of the oil-water mixture, or any of the flow meters for detecting total organic carbon (TOC) made by vendors such as Shimadzu.

Both the first oil sensor and the flow meter preferably connect to a display screen which exhibits their measurements for monitoring purposes. The oil sensor is also connected to an appropriate alarm which is generated when the oil sensor detects an excessive amount of oil in the flow through the discharge hose. The oil sensor also provides its signal to an electronic controller which controls a pair of valves, one in the discharge hose and one in a return hose which connects the discharge hose product back to the bottom of the gravity based oil-water separator tank. These two valves work in tandem with the valve in the discharge hose being open when the oil sensor has not detected any excessive oil and closed when the oil sensor does detect an excessive amount of oil. When the discharge hose valve is opened, the return hose valve is closed and vice versa.

These valves are located a predetermined distance downstream from the first oil sensor, such as 30 feet. Since the flow rate through the discharge hose is controlled by the flow meter in the pump, the controller can determine when to send control signals to the two valves after the first oil sensor has detected an excessive amount of oil to direct the flow in the discharge hose back to the gravity oil-water separator tank. A second oil sensor, which may be of the same type as the first oil sensor, has its probe connected to the discharge hose downstream of the two valves. This oil sensor provides its output to a recorder which maintains a record of the oil content of the discharged water for regulatory purposes, such as meeting Coast Guard regulations. The second oil sensor is also connected to the alarm and turns on the alarm when the water in the discharge hose downstream of the valves contains an excessive amount of oil. That signal closes a shutoff valve at the output of the discharge hose.

The system thus depends on the initial separation of the oil and water in the gravity based separator tank and monitors the water removed from the bottom of the separator for excessive oil levels, in which case they are returned to the oil-water separator tank for further separation so that only sufficiently pure water is discharged by the system back into the body of water.

The water may be discharged into the center of an absorbent floating ring which will pick up some part of any remaining oil to further purify the discharge.

BRIEF DESCRIPTION OF THE DRAWINGS

Other objects, advantages, and applications of the present invention will be made clear by the following detailed description of a preferred embodiment of the invention. The description makes reference to the accompany drawings in which.

DETAILED DESCRIPTION OF A PREFERRED EMBODIMENT

Figure 1:
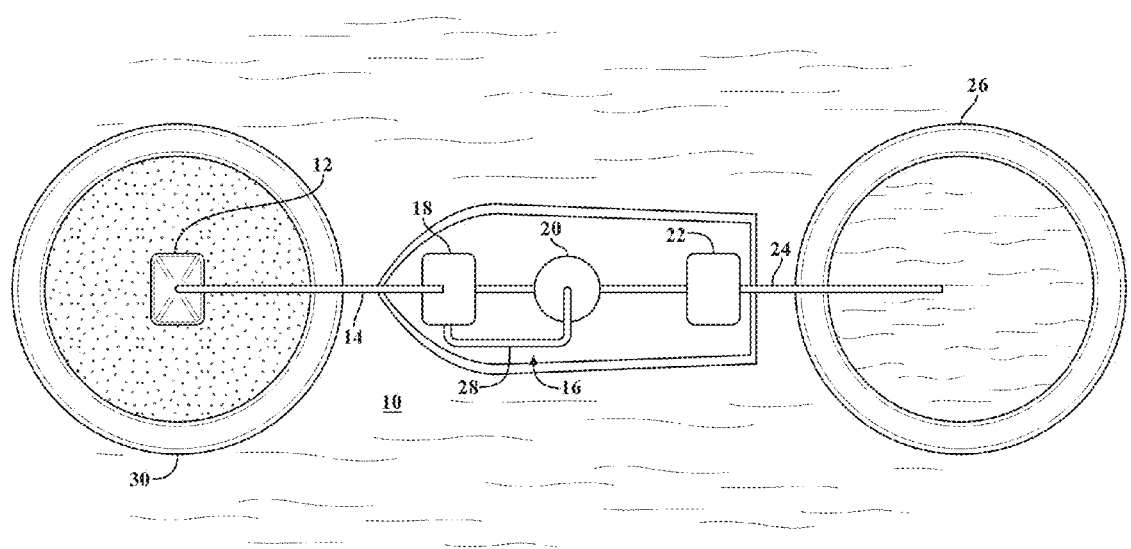
FIG. 1 is a plan view of an overall schematic of the invention illustrating a skimming mechanism positioned in a body of water polluted by oil from a spill or the like and transferring the skimmed oil/water to a marine vessel supporting decanting apparatus comprising a gravity separation tank for receiving the skimmed oil/water and allowing separation by gravity forces into an upper oil layer and a lower water layer, with an output from the lower level to process apparatus including oil sensors for passing water meeting regulatory standards to a discharge back into the body of water and returning fluid containing an excess of oil back to the settling tank.

Referring to FIG. 1, which illustrates a preferred embodiment of the present invention, the system is typically used on a body of water 10, which may be a lake, ocean, inland pond, or the like. Alternatively the system might operate on polluted water carried in on vehicles such as tank trucks or trains, or pipelines and the like. The water will typically be polluted with hydrocarbons like oil, diesel fuel, or the like, which have a lower density than water and accordingly collect on the surface of the body of water 10.

In a typical application, the polluted water is drawn from the surface of the body 10 by some form of skimmer 12 which may be of the type illustrated in my U.S. Pat. No. 3,578,171 or U.S. Pat. No. 5,108,591 and other known skimming devices. The skimmer 12 effectively vacuums the surface and feeds the collected skimmed oil/water through a hose 14 to a decanting facility 16. The intake skimmer 12 may be surrounded by a buoyant slick bar 30 of the type illustrated in my U.S. Pat. No. 3,578,171 which may confine the pollutants largely within the perimeter of the bar 30. In the preferred embodiment of the invention the purification station is disposed on a ship but could be disposed on land in alternative embodiments of the invention.

A vacuum pump 18 is connected in the hose line 14 and draws the oil/water from the skimmer 12 and feeds it to an oil/water separator 20 which constitutes a tank in which the skimmed oil/water tends to separate, under the force of gravity, into an upper layer consisting primarily of the polluting hydrocarbon or the like and a lower level which is primarily water. Various stirring devices are used in the prior art to accelerate and enhance the separation of the oil and water.

The water at the lower end of the separator tank 20 is then drawn out and passed to a decanting system 22 which will be described in detail in connection with FIG. 2. Broadly, the unit 22 includes one or more sensors which detect the concentration of oil in the mixture being pumped out of the bottom of the tank 18 and pass the fluid to an outlet pipe 24 if the oil content is below a predetermined level, usually set by regulations under which the system operates. This relatively oil-free water flows through the pipe 24 to return that fluid to the body of water 10. The area in which the pipe 10 deposits the water may be surrounded by a buoyant ring 26 formed of an oil-absorbent material so that this return flow is further purified of the polluting hydrocarbons as the water flows outside the bounds of the ring 26.

If the unit 22 senses that the flow contains fluid with a higher percentage of pollutants than the regulations allow to be returned to the body of water 10, valving in the unit 22 returns the flow to the gravity separation tank 20 through a return conduit 28 for further purification. When the sensors in the unit 22 sense that the water flow is sufficiently pure, the valving is controlled to again flow the water through the pipe 24 back into the body of water 10.

Figure 2:
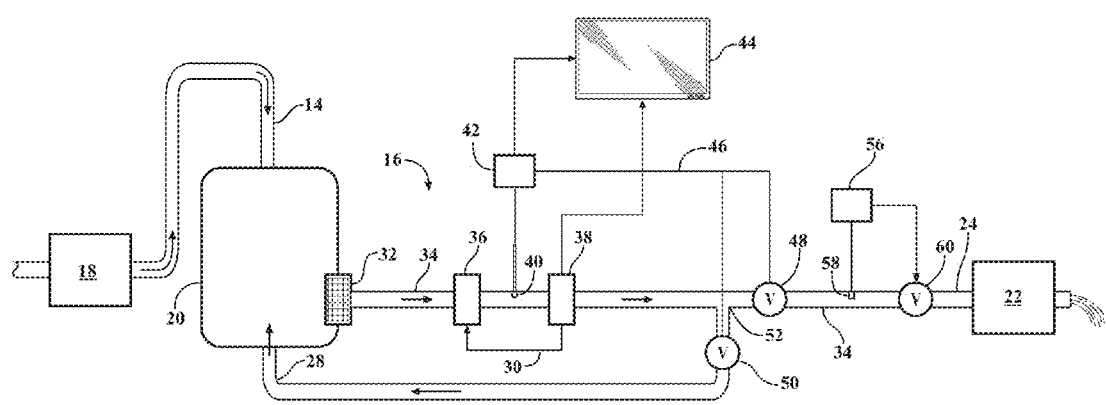
FIG. 2 is a detailed schematic view of the oil processing apparatus.

The details of the preferred embodiment of the decanting system 16 are illustrated in the schematic of FIG. 2. The output of the oil/water gravity separation tank 20 is through a screen 32 located near the bottom of the tank 20 which prevents the escape of any debris in the incoming flow from the pipe 14 that may settle on the bottom of the tank 20. The output filtered by the screen 32 passes into a pipe 34 under the influence of a pump 36. A flow meter 38 downstream from the pump 36 on the line 34 measures the flow through the pipe and sends a control signal back to the pump 36 via line 28 in order to maintain a predetermined constant flow through the pipe 34.

The oil contamination of the flow through the pipe 34 is first measured by a probe 40 which extends into the pipe 34 and connects to an analysis sensor 42 which measures any oil contamination in the flow through the line 34. In a preferred embodiment of the invention this oil sensor operates on fluorescence of the oil when subjected to ultraviolet illumination by the probe 40. These sensors are commercially available from a number of sources including Cambridge Consultants Inc. of Cambridge, Mass. Other types of oil sensors may be employed such as those that detect total organic carbon (TOC) made by vendors such as Shimadzu or sensors based on the conductivity of the oil/water mixture.

The sensor 42 has a preset level for the maximum oil concentration in the flow through the line 34. Typically this will be less than about 15 ppm. This value is determined by regulatory agencies such as MARPOL set up by the International Convention for the Prevention of Pollution of Ships. Annex I of the MARPOL regulations covers pollution by oil and sets forth the maximum oil content of discharges into waterways.

The sensor 42 preferably includes alarms such as audible or flashing lights when the measured oil in the water exceeds the preset limit. The sensor 42 also provides its measurement of the oil content of the water to a display screen 44. The display screen also receives a signal from flow meter 38, indicating whether the flow rate through pipe 34 is at the correct preset value.

The sensor 42 generates a control signal on line 46 which indicates whether the oil content of the liquid flowing through the line 34 is greater or less than the preset maximum value. The signals on line 46 are connected to a pair of valves 48 and 50. The valve 48 is located in the line 34 and either opens or closes passage through that line, shutting off the flow when the sensor 42 detects an excessive percentage of oil in the fluid. The signal on line 46 is also provided to the valve 50 located in a T connection 52 to the line 34, just before the position of the valve 48. The valve 50 provides output to the line 28 which returns fluid having an excessive level of oil to the tank 20 for further processing. The two signals on the lines 48 and 50 work in tandem. When the oil level detected by the sensor 42 is below the maximum value, the valve 48 is opened and the valve 50 is closed. When the level of oil detected by the sensor 42 becomes too high, the signal shuts off the flow through the line 34 via valve 48 and opens the return flow to the line 28 through the valve 50.

Since the pump 36 controlled by the flow meter 38 maintains a constant flow rate through the pipe 34, and since the distance of the probe 40 of the sensor 42 is a known distance from the valves 48 and 52, the sensor 42 controls the switching of the valves 48 and 50 a predetermined time after the sensor detects an excessive level of oil in the flow through the line 44, selected so that the valves 48 and 52 will be switched when the oil flowing at the point of the sensor 42 receiving an excessive reading from its probe 40 reaches the valves 48 and 50. For example, the probe 40 might be 30 feet from the valves 48 and 50 and with a controlled flow rate of 15 feet per second, the valves would be switched 2 seconds after the sensor detects an exceedingly high level of oil contamination in the flow.

In the preferred embodiment of the invention a second oil level sensor 56 has a probe 58 located downstream from the valve 48. The sensor 56 includes a data recorder which maintains a record of the level of contamination of the flow beyond the valve 48, for regulatory purposes governing the maximum level of contamination in oil that may be discharged into the body of water 10. The sensor 56 may also control a third valve 60 in the line 34 downstream of the valve 48, which will shut off the discharged flow in the event of an excessively high reading. When the valve 60 is open, the relatively pure water passing through flows to a discharge pipe 24 which preferably returns the water to the body of water 10.

It should be understood that the heretofore described preferred embodiment is an exemplar of the present invention and the scope of the invention should only be based upon the following claims. For example, the decanter apparatus 16 might be based on land and the skimmed oil fed to it via pipelines, small vessels, or the like.

Having thus described my invention I claim:

1. Apparatus for receiving a flow of liquid skimmed from a body of water contaminated by hydrocarbons or the like, operative to separate the hydrocarbons from the water, comprising:
   a settling tank for receiving the flow of skimmed liquid operative to separate the liquid under the influence of gravity into a predominantly hydrocarbon upper fluid layer and a predominantly water lower fluid layer;
   a pump for withdrawing the predominantly water fluid from the lower level of the tank and passing it through a first pipe;
   a first hydrocarbon concentration meter connected to measure the hydrocarbon content of liquid passing through the first pipe and to generate a first control signal when the concentration of hydrocarbon exceeds a predetermined value; and
   a first valve connected to receive the first control signal and to direct the flow through a second pipe to the settling tank at such times as the first control signal indicates that the hydrocarbon concentration exceeds said predetermined value and to a discharge pipe directed to a second hydrocarbon concentration meter when the first control signal indicates that the concentration is below said predetermined value, the second hydrocarbon concentration meter connected to measure the hydrocarbon content of liquid passing through the discharge pipe and to generate a second control signal; and a second valve connected to the second hydrocarbon concentration meter to prevent the flow from discharging into the body of water when the second control signal from the second hydrocarbon concentration meter exceeds a predetermined value.

2. The apparatus of claim 1, wherein said first hydrocarbon concentration meter measures the hydrocarbon content of the flow based on fluorescence of the hydrocarbon when subjected to ultraviolet illumination.

3. The apparatus of claim 1, wherein the first hydrocarbon concentration meter measuring the hydrocarbon content of liquid passing through the first pipe is chosen from the group consisting of sensors which operate on fluorescence of the hydrocarbon when subjected to ultraviolet illumination, sensors which detect total organic carbon content of the hydrocarbon, and sensors based on the conductivity of the liquid mixture.

4. The apparatus of claim 1, further comprising a filter at the connection between said pipe and the lower level of the settling tank to remove debris having a greater density than water which may have settled to the lower level of the settling tank.

5. The apparatus of claim 1, further comprising a flow meter for the liquid passing through said first pipe, operative to generate a signal for controlling said pump to maintain the fluid flow rate through the pipe at a predetermined constant level.

6. The apparatus of claim 1, wherein said first control signal is generated at a predetermined time delay after the first hydrocarbon concentration meter detects that the concentration of hydrocarbon in the liquid flowing through the first pipe exceeds a predetermined value, said time delay being calculated to control said first valve as the flow through the first pipe at the time the first hydrocarbon concentration meter detected that the concentration of hydrocarbon in the liquid flowing through the pipe exceeded said predetermined value reaches said first valve.

7. The apparatus of claim 1, wherein said first valve has two states in which it either directs the flow through the second pipe to the settling tank or, alternatively, blocks the flow through the second pipe from passing to the settling tank; and said second valve controls the flow through the first pipe to the discharge pipe or alternatively blocks flow through the first pipe to the discharge pipe, and when the first valve is opened by an appropriate signal from the first hydrocarbon concentration meter the second valve is closed and when the control signal from the first hydrocarbon concentration meter indicates that the concentration of hydrocarbon exceeds a predetermined value, the flow through the first and second valves is reversed.

8. The apparatus of claim 1, further comprising a recorder connected to said second hydrocarbon concentration meter for maintaining a record of the concentration of the hydrocarbon discharged into the body of water, for regulatory purposes.

* * * * *